United States Patent
Liu et al.

(10) Patent No.: US 10,488,289 B2
(45) Date of Patent: Nov. 26, 2019

(54) PRESSURE SENSORS WITH PLUGS FOR COLD WEATHER PROTECTION AND METHODS FOR MANUFACTURING THE PLUGS

(71) Applicant: Sensata Technologies, Inc., Attleboro, MA (US)

(72) Inventors: Luzhao Liu, Jiangsu (CN); Xuan Hu, Jiangsu (CN); Yang Li, Shanghai (CN); Lei Wang, Jiangsu (CN)

(73) Assignee: Sensata Technologies, Inc., Attleboro, MA (US)

( * ) Notice: Subject to any disclaimer, the term of this patent is extended or adjusted under 35 U.S.C. 154(b) by 321 days.

(21) Appl. No.: 15/389,266

(22) Filed: Dec. 22, 2016

(65) Prior Publication Data

US 2017/0292890 A1   Oct. 12, 2017

(30) Foreign Application Priority Data

Apr. 11, 2016 (CN) .......................... 2016 1 0220546

(51) Int. Cl.
| | |
|---|---|
| *G01L 19/02* | (2006.01) |
| *G01L 19/04* | (2006.01) |
| *G01L 19/06* | (2006.01) |

(52) U.S. Cl.
CPC .............. *G01L 19/02* (2013.01); *G01L 19/04* (2013.01); *G01L 19/0672* (2013.01)

(58) Field of Classification Search
CPC ... G01L 19/147; G01L 9/0042; G01L 9/0072; G01L 13/025; G01L 19/04; G01L 9/0054;
(Continued)

(56) References Cited

U.S. PATENT DOCUMENTS

| 3,876,821 A | 4/1975 | Pringle |
| 4,111,517 A | 9/1978 | Debaigt |
(Continued)

FOREIGN PATENT DOCUMENTS

| CN | 103454032 A | 12/2013 |
| DE | 4234289 C1 | 11/1993 |
(Continued)

OTHER PUBLICATIONS

European Search Report for European Patent Application No. 17163135.1 dated Aug. 3, 2017, 8 pages.
(Continued)

*Primary Examiner* — Andre J Allen
(74) *Attorney, Agent, or Firm* — Burns & Levinson LLP; Joseph M. Maraia; George N. Chaclas

(57) ABSTRACT

A pressure sensor including a housing with a sensing element therein. A communication passageway is formed in the housing. The sensing element is in fluid communication with an outside of the housing through the communication passageway. The pressure sensor is further provided with a compensating structure, so that when a contact force is increased due to occurrence of a volume expansion of a liquid passed into the housing through the communication passageway, the compensating structure is used to compensate the volume expansion. A plug may also be used with the pressure sensor. The pressure sensor is such that when the liquid within the pressure sensor has an increased volume due to being frozen, such increased volume can be compensated, so as to prevent the components of the pressure sensor from being damaged.

17 Claims, 9 Drawing Sheets

(58) Field of Classification Search
CPC ............. G01L 9/0075; G01L 19/0038; G01L 19/0084; G01L 19/14; G01L 19/0069; G01L 19/0618; G01L 19/0645; G01L 9/0055; G01L 9/0073; G01L 19/0092; G01L 19/143; G01L 9/0051; G01L 9/0052; G01L 11/025; G01L 19/0007; G01L 19/0046; G01L 19/06; G01L 19/0627; G01L 19/0681; G01L 9/00; G01L 9/0041; G01L 9/0044; G01L 11/04; G01L 19/0023; G01L 19/0672; G01L 19/069; G01L 19/142; G01L 19/16; G01L 27/002; G01L 7/00; G01L 7/163; G01L 7/166; G01L 9/0047; G01L 11/02; G01L 13/00; G01L 15/00; G01L 19/0609; G01L 19/083; G01L 19/10; G01L 19/148; G01L 7/08; G01L 9/0045; G01L 9/0048; G01L 9/006; G01L 9/007; G01L 9/0076; G01L 9/045; G01L 9/06; G01L 9/065; G01L 9/12; G01L 9/125; G01L 11/00; G01L 17/00; G01L 19/00; G01L 19/0015; G01L 19/003; G01L 19/0076; G01L 19/02; G01L 19/08; G01L 19/141; G01L 19/145; G01L 19/146; G01L 1/142; G01L 1/2262; G01L 1/246; G01L 21/12; G01L 23/16; G01L 27/005; G01L 27/007; G01L 7/04; G01L 7/063; G01L 7/082; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/04; G01L 9/095; G01L 9/085; G01L 9/105; G01L 9/14; G01L 9/16

See application file for complete search history.

(56) References Cited

U.S. PATENT DOCUMENTS

| | | |
|---|---|---|
| 4,131,088 A | 12/1978 | Reddy |
| 4,287,772 A | 9/1981 | Mounteer et al. |
| 4,347,745 A | 9/1982 | Singh |
| 4,400,681 A | 8/1983 | Brown et al. |
| 4,599,485 A | 7/1986 | Smolik |
| 4,747,506 A | 5/1988 | Stuchlik, III |
| 4,771,427 A | 9/1988 | Tulpule et al. |
| 4,888,662 A | 12/1989 | Bishop |
| 4,903,164 A | 2/1990 | Bishop et al. |
| 5,101,659 A | 4/1992 | Takeuchi |
| 5,101,665 A | 4/1992 | Mizuno |
| 5,144,843 A | 9/1992 | Tamura et al. |
| 5,181,417 A | 1/1993 | Nishida et al. |
| 5,184,515 A | 2/1993 | Terry et al. |
| 5,209,121 A | 5/1993 | Hafner |
| 5,222,397 A | 6/1993 | Kodama |
| 5,231,301 A | 7/1993 | Peterson et al. |
| 5,284,107 A | 2/1994 | Milne et al. |
| 5,331,857 A | 7/1994 | Levine et al. |
| 5,349,865 A | 9/1994 | Kavli et al. |
| 5,408,045 A | 4/1995 | Jorgensen et al. |
| 5,425,371 A | 6/1995 | Mischenko |
| 5,448,444 A | 9/1995 | Provenzano et al. |
| 5,457,988 A | 10/1995 | Delatorre |
| 5,587,535 A | 12/1996 | Sasaki et al. |
| 5,625,151 A | 4/1997 | Yamaguchi |
| 5,629,486 A | 5/1997 | Viduya et al. |
| 5,665,921 A | 9/1997 | Gerst et al. |
| 5,741,975 A | 4/1998 | Vaughn, II et al. |
| 5,802,912 A | 9/1998 | Pitzer et al. |
| 5,866,822 A | 2/1999 | Willig |
| 5,869,766 A | 2/1999 | Cucci et al. |
| 6,050,145 A | 4/2000 | Olson et al. |
| 6,070,883 A | 6/2000 | Marto |
| 6,119,524 A | 9/2000 | Kobold |
| 6,204,594 B1 | 3/2001 | Ingham |
| 6,351,998 B1 | 3/2002 | Hohnstadt et al. |
| 6,353,181 B1 | 3/2002 | Jarry et al. |
| 6,389,903 B1 | 5/2002 | Oba et al. |
| 6,411,038 B2 | 6/2002 | Murai et al. |
| 6,453,747 B1 | 9/2002 | Weise et al. |
| 6,487,911 B1 | 12/2002 | Frackelton et al. |
| 6,497,586 B1 | 12/2002 | Wilson |
| 6,536,287 B2 | 3/2003 | Beekhuizen et al. |
| 6,539,787 B1 | 4/2003 | Murai et al. |
| 6,568,276 B1 | 5/2003 | Ciminelli |
| 6,700,174 B1 | 3/2004 | Miu et al. |
| RE38,557 E | 7/2004 | Englund et al. |
| 6,763,724 B2 | 7/2004 | DiPaola et al. |
| 6,871,546 B2 | 3/2005 | Scheurich et al. |
| 6,876,943 B2 | 4/2005 | Wegerich |
| 6,952,042 B2 | 10/2005 | Stratton et al. |
| 7,114,396 B2 | 10/2006 | Oda et al. |
| 7,197,937 B2 | 4/2007 | Amore et al. |
| 7,207,214 B1 | 4/2007 | Wlodarczyk |
| 7,302,855 B2 | 12/2007 | Oda |
| 7,316,164 B2 | 1/2008 | Toyoda et al. |
| 7,383,737 B1 | 6/2008 | Lin et al. |
| 7,412,894 B2 | 8/2008 | Ueyanagi et al. |
| 7,518,234 B1 | 4/2009 | Okojie |
| 7,555,957 B2 | 7/2009 | Toyoda |
| 7,570,065 B2 | 8/2009 | Harish et al. |
| 7,578,194 B1 | 8/2009 | Hadjiloucas et al. |
| 7,726,197 B2 | 6/2010 | Selvan et al. |
| 7,739,922 B2 | 6/2010 | Inamori |
| 7,775,119 B1 | 8/2010 | Suminto et al. |
| 8,056,752 B2 | 11/2011 | Carnevali |
| 8,104,357 B2 | 1/2012 | Schlitzkus et al. |
| 8,156,816 B2 | 4/2012 | Willner et al. |
| 8,215,176 B2 | 7/2012 | Ding et al. |
| 8,250,909 B2 | 8/2012 | Kern et al. |
| 8,297,115 B2 | 10/2012 | Borgers et al. |
| 8,429,956 B2 | 4/2013 | Borgers et al. |
| 8,453,513 B2 | 6/2013 | Bigliati et al. |
| 8,516,897 B1 | 8/2013 | Jones et al. |
| 8,627,559 B2 | 1/2014 | Suminto et al. |
| 8,671,767 B2 | 3/2014 | Kaiser et al. |
| 8,950,247 B2 | 2/2015 | Borgers et al. |
| 8,984,949 B2 | 3/2015 | Staiger et al. |
| 9,046,436 B2 | 6/2015 | Schlitzkus et al. |
| 9,063,033 B2 | 6/2015 | Mayer et al. |
| 9,217,685 B2 | 12/2015 | Wohlgemuth |
| 9,534,975 B2 | 1/2017 | Kachenko et al. |
| 2001/0015402 A1 | 8/2001 | Murai et al. |
| 2001/0039837 A1 | 11/2001 | Tanizawa et al. |
| 2002/0029639 A1 | 3/2002 | Wagner et al. |
| 2002/0073533 A1 | 6/2002 | Park |
| 2002/0100948 A1 | 8/2002 | Yoshihara et al. |
| 2003/0019298 A1* | 1/2003 | Scheurich ........... G01L 19/0627 73/715 |
| 2003/0033884 A1 | 2/2003 | Beekhuizen et al. |
| 2003/0150275 A1 | 8/2003 | Wagner et al. |
| 2004/0007073 A1 | 1/2004 | Weise |
| 2004/0007074 A1 | 1/2004 | DiPaola et al. |
| 2004/0007075 A1 | 1/2004 | Ishiguro et al. |
| 2004/0015282 A1 | 1/2004 | Babala et al. |
| 2004/0020300 A1 | 2/2004 | Boehler et al. |
| 2004/0146719 A1 | 7/2004 | Baney et al. |
| 2004/0147140 A1 | 7/2004 | Fan et al. |
| 2004/0200286 A1 | 10/2004 | Mast |
| 2005/0011273 A1 | 1/2005 | Sasaki et al. |
| 2005/0103111 A1 | 5/2005 | Imai et al. |
| 2005/0252300 A1 | 11/2005 | Miller |
| 2006/0000289 A1 | 1/2006 | Jonsson |
| 2006/0042393 A1 | 3/2006 | Kaneko et al. |
| 2006/0042394 A1 | 3/2006 | Kosh et al. |
| 2006/0042395 A1 | 3/2006 | Lepine et al. |
| 2006/0053894 A1 | 3/2006 | Kunda et al. |

(56) References Cited

U.S. PATENT DOCUMENTS

| | | |
|---|---|---|
| 2006/0090566 A1 | 5/2006 | Oda |
| 2006/0123887 A1 | 6/2006 | Dordet |
| 2006/0214202 A1 | 9/2006 | Zorich et al. |
| 2006/0278012 A1 | 12/2006 | Fujimoto et al. |
| 2007/0148788 A1 | 6/2007 | Hsieh et al. |
| 2007/0202628 A1 | 8/2007 | Wuertz |
| 2007/0205776 A1 | 9/2007 | Harish et al. |
| 2008/0148860 A1 | 6/2008 | Murakami et al. |
| 2008/0222884 A1 | 9/2008 | Bradley et al. |
| 2008/0227331 A1 | 9/2008 | Qiu |
| 2008/0262584 A1 | 10/2008 | Bottomley et al. |
| 2009/0071260 A1 | 3/2009 | Speldrich |
| 2009/0075529 A1 | 3/2009 | Johnston et al. |
| 2009/0282926 A1 | 11/2009 | Hauer et al. |
| 2009/0315864 A1 | 12/2009 | Silverbrook et al. |
| 2009/0320576 A1 | 12/2009 | Borgers et al. |
| 2010/0052578 A1 | 3/2010 | Kim |
| 2010/0192696 A1 | 8/2010 | Schlitzkus et al. |
| 2010/0219487 A1 | 9/2010 | Donis |
| 2010/0239109 A1 | 9/2010 | Lutz et al. |
| 2010/0267291 A1 | 10/2010 | Chabineau-Lovgren et al. |
| 2010/0281994 A1 | 11/2010 | Brown et al. |
| 2011/0088480 A1 | 4/2011 | Koehler et al. |
| 2011/0108322 A1 | 5/2011 | Kaiser |
| 2011/0153277 A1 | 6/2011 | Morath |
| 2011/0290030 A1 | 12/2011 | Willner et al. |
| 2011/0320158 A1 | 12/2011 | Steckenreiter et al. |
| 2012/0067130 A1 | 3/2012 | Kaiser et al. |
| 2012/0227477 A1 | 9/2012 | Borgers et al. |
| 2013/0052936 A1 | 2/2013 | Jordan |
| 2013/0073189 A1 | 3/2013 | Korenaga et al. |
| 2013/0192379 A1 | 8/2013 | Petrarca |
| 2013/0248024 A1 | 9/2013 | Dunn et al. |
| 2013/0264664 A1 | 10/2013 | Nimura et al. |
| 2013/0336511 A1 | 12/2013 | Underbrink et al. |
| 2014/0130585 A1 | 5/2014 | Borgers et al. |
| 2014/0130586 A1 | 5/2014 | Zwollo et al. |
| 2014/0144206 A1 | 5/2014 | Uehlin et al. |
| 2014/0219713 A1 | 8/2014 | Balsells et al. |
| 2014/0260648 A1 | 9/2014 | Aoyama et al. |
| 2014/0338448 A1 | 11/2014 | Ashino |
| 2015/0135853 A1 | 5/2015 | McNeal et al. |
| 2015/0377729 A1 | 12/2015 | Hio et al. |
| 2016/0025581 A1 | 1/2016 | Kazama et al. |
| 2016/0133762 A1 | 5/2016 | Blasco Claret |
| 2016/0282205 A1 | 9/2016 | Huo et al. |
| 2016/0333683 A1* | 11/2016 | Delgado ............. E21B 47/0006 |
| 2017/0350778 A1* | 12/2017 | Gadini ................ G01L 19/0038 |
| 2018/0259415 A1* | 9/2018 | Hershey ..................... G01L 7/08 |

FOREIGN PATENT DOCUMENTS

| | | |
|---|---|---|
| DE | 4407212 C1 | 8/1995 |
| DE | 102004048367 A1 | 4/2006 |
| DE | 102008026611 | 12/2009 |
| EP | 085584 A1 | 8/1983 |
| EP | 1074827 A2 | 2/2001 |
| EP | 1211497 A2 | 6/2002 |
| EP | 1560012 A1 | 8/2005 |
| EP | 1826543 A2 | 8/2007 |
| EP | 2390641 A2 | 11/2011 |
| EP | 2620757 A1 | 7/2013 |
| EP | 2829699 | 1/2015 |
| EP | 2848908 A1 | 3/2015 |
| FR | 2791430 A1 | 9/2000 |
| GB | 2066590 A | 7/1981 |
| JP | 406037334 | 2/1994 |
| JP | 2009195085 A | 8/2009 |
| JP | 2010256187 A | 11/2010 |
| WO | 98/31997 | 7/1998 |
| WO | WO-0242720 A2 | 5/2002 |
| WO | 02066948 A1 | 8/2002 |
| WO | WO-2003100371 A1 | 12/2003 |
| WO | WO-2006102460 A1 | 9/2006 |
| WO | 2010/013216 A1 | 2/2010 |
| WO | WO-2011155054 A1 | 12/2011 |
| WO | WO-2013083320 A1 | 6/2013 |
| WO | WO-2013110045 A1 | 7/2013 |
| WO | WO-2014132730 A1 | 9/2014 |

OTHER PUBLICATIONS

Communication from the Examination Division from related EP Application No. 17163135.1 dated Oct. 31, 2018.
European Search Report from related EP Application No. 17163135.1 dated Aug. 3, 2017.

* cited by examiner

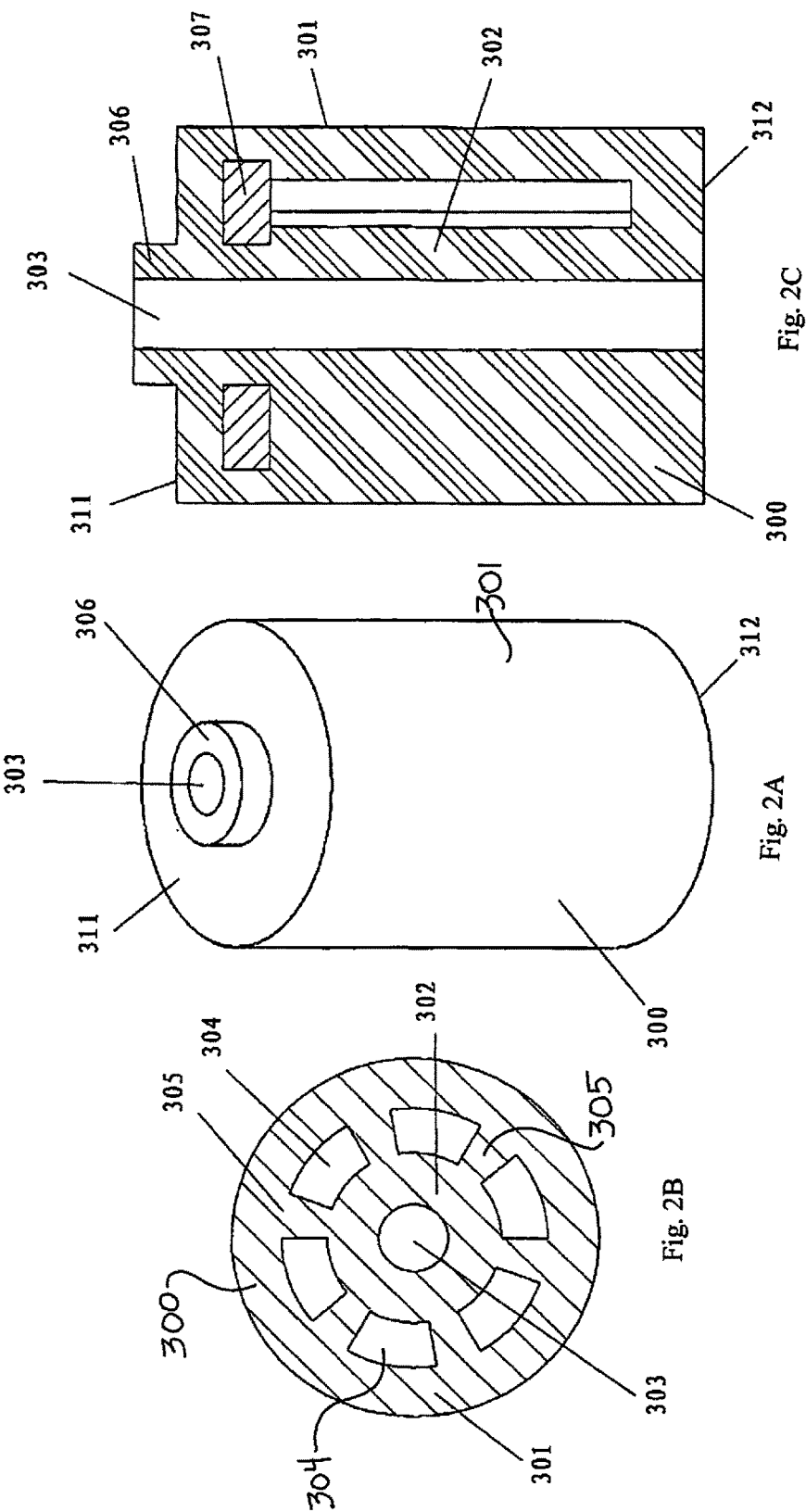

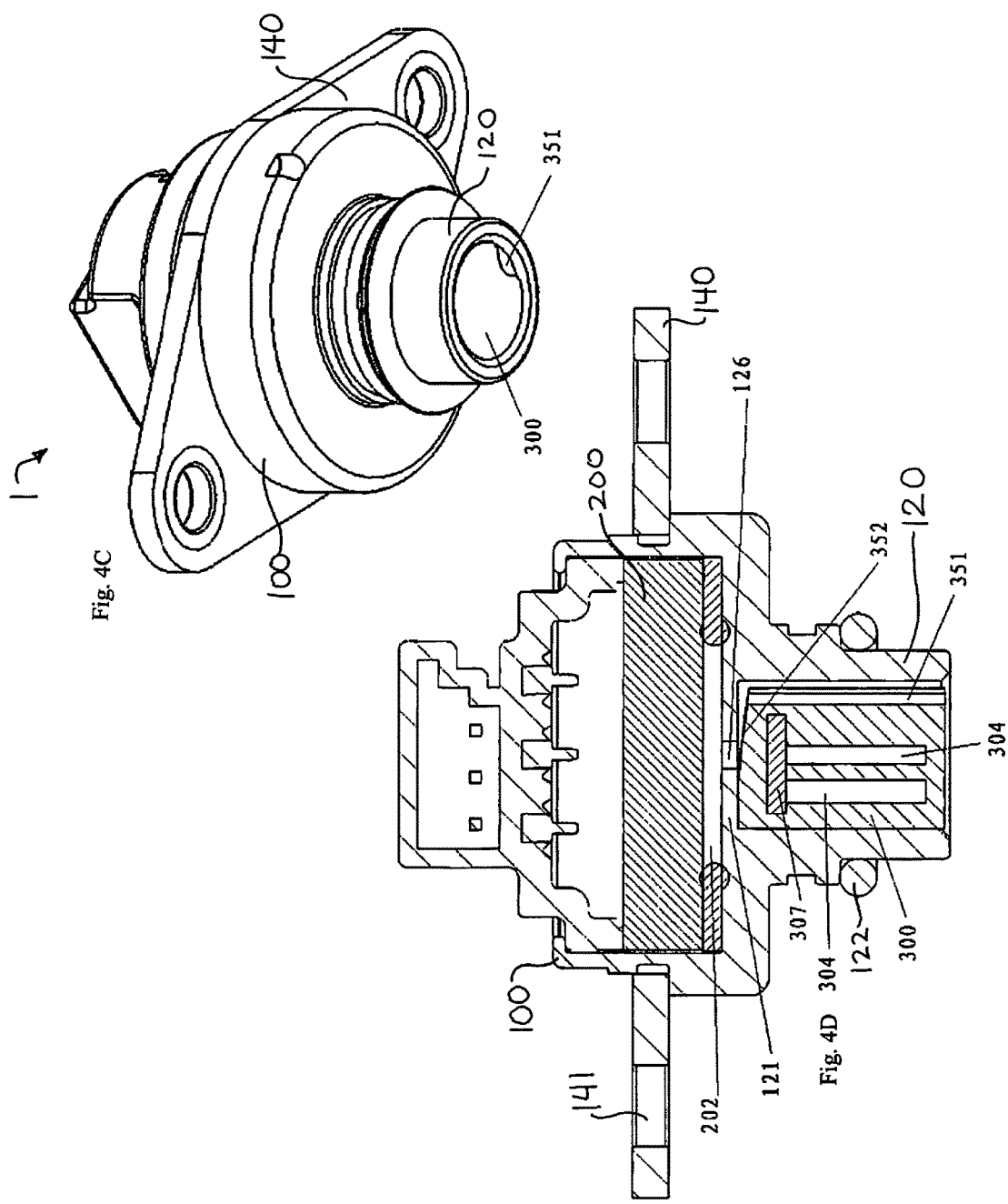

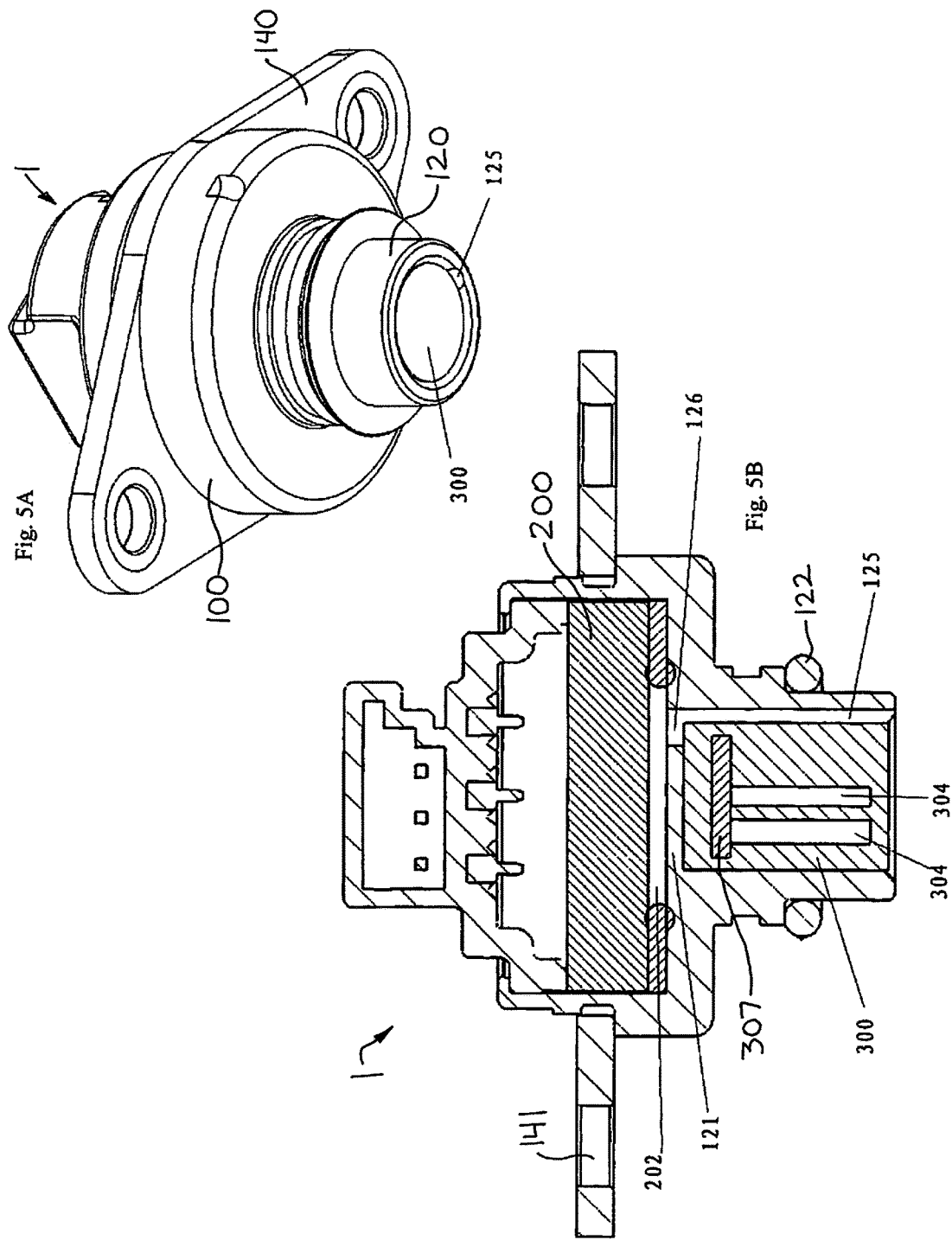

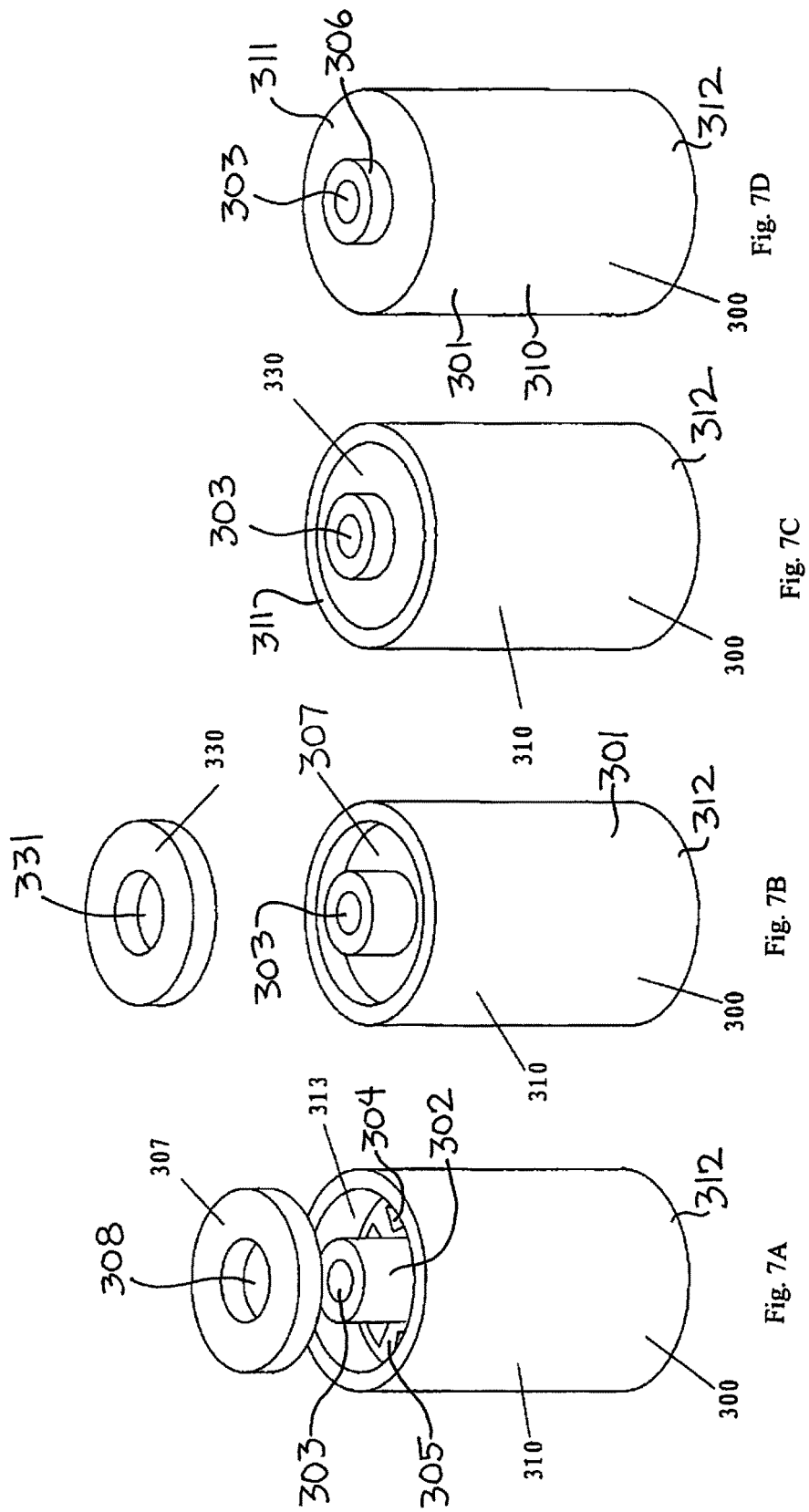

PRESSURE SENSORS WITH PLUGS FOR COLD WEATHER PROTECTION AND METHODS FOR MANUFACTURING THE PLUGS

CROSS-REFERENCE TO RELATED APPLICATION

This application claims priority to Chinese Patent Application No. 201610220546.7 filed Apr. 11, 2016, which is incorporated herein by reference.

TECHNICAL FIELD

The disclosure relates to the field of sensors, and in particular, the present disclosure relates to a pressure sensor, which is primarily used to measure the pressure of a liquid, particularly an aqueous urea solution. The present disclosure further relates to a plug used with the pressure sensor and a method for manufacturing the plug.

BACKGROUND ART

It is well known to measure the pressure of a liquid by using a pressure sensor. During a measuring process, generally the pressure sensor will be in contact with the liquid to be measured. In particular, the liquid passes into the pressure sensor and contacts a sensing element, so that the pressure of the liquid can be measured.

In some case, the liquid passed into the pressure sensor may be frozen due to such as a low temperature and converted into solid phase, which will cause a volume expansion and thus the damage of the components of the pressure sensor, particularly the components which are in contact with the liquid, for example the sensing element.

It is well known that a mass of contamination emission may be generated in industrial applications. For example, a mass of exhaust containing nitric oxides (NOx) will be discharged from the vehicle. Many technical solutions have been developed to reduce these emissions. Selective catalytic reduction (SCR) is one solution that is widely used.

In most selective catalytic reduction system, aqueous urea solution (AUS) is generally used as a working medium, such as 32.5% aqueous urea solution, so as to reduce the content of the nitric oxides. In recent selective catalytic reduction system, a urea pressure sensor (UPS) is generally used to monitor the pressure of the aqueous urea solution, to ensure normal operation of the selective catalytic reduction system. During operation, a portion of the urea pressure sensor (e.g., the sensing element) will be in contact with the aqueous urea solution, so as to measure the pressure of the aqueous urea solution.

However, with respect to the selective catalytic reduction system, a key technical problem is that the aqueous urea solution will be frozen at a temperature of about −11° C. or less. The volume of the aqueous urea solution will be increased after being frozen, so that a contact force between the aqueous urea solution and the sensing element of the urea pressure sensor will be increased, which will result in damage of the components (e.g., sensing element) of the urea pressure sensor in contact with the aqueous urea solution.

In the case of using a selective catalytic reduction system, such as in a vehicle, it is possible for the system to be subjected to a temperature of about −11° C. or less. In this case, it is a challenge how to address the effect of the frozen aqueous urea solution to the operation of the selective catalytic reduction system.

SUMMARY OF THE INVENTION

An object of the present disclosure is to provide a pressure sensor, particularly a urea pressure sensor, so as to overcome the above drawbacks in the art.

An object of the present disclosure is to provide a pressure sensor, such that when the liquid within the pressure sensor has an increased volume due to being frozen, such increased volume can be compensated, so as to prevent the components of the pressure sensor from being damaged.

Another object of the present disclosure is to provide a pressure sensor, which can control the freezing sequence of the liquid within the pressure sensor, so as to prevent the components of the pressure sensor from being damaged.

Another object of the present disclosure is to provide a pressure sensor, which utilizes various assistance means to compensate the increased volume of the frozen liquid of the pressure sensor.

Another object of the present disclosure is to provide a plug used with the pressure sensor and a method for manufacturing the plug.

The above and other objects of the present disclosure are achieved via the following technical solutions.

One embodiment of the present disclosure is directed to a pressure sensor including a housing and a sensing element disposed in the housing. A communication passageway is formed in the housing, and the sensing element is in communication with an outside of the housing through the communication passageway. The pressure sensor is provided with a compensating structure, so that when a contact force is increased due to a volume expansion of a liquid passed into the housing through the communication passageway, the compensating structure is used to compensate the volume expansion.

In one embodiment of the pressure sensor, the compensating structure comprises a first compensating structure configured to increase the volume of the communication passageway and/or a second compensating structure configured to control the freezing sequence of the liquid passed into the pressure sensor. The first compensating structure may be a plug, and a pressure tube formed in the housing, wherein the plug is removably fitted in the pressure tube of the housing.

In another embodiment of the pressure sensor, the plug is formed with a through-hole which constitutes at least a portion of the communication passageway. A through-channel is formed on a perimeter of the plug, wherein the through-channel constitutes at least a portion of the communication passageway. Alternatively, a groove is formed on an inner wall of the pressure tube, wherein the groove cooperates with the plug so as to constitute at least a portion of the communication passageway.

In still another embodiment of the pressure sensor, the portion of the plug used to constitute the communication passageway can be deformed elastically to change the volume of the communication passageway.

In one embodiment of the pressure sensor, an enclosed chamber is formed in an interior of the plug. The chamber facilitates forming the plug during molding. Moreover, the chamber facilitates deforming the portion used to form the communication passageway, so as to compensate the volume expansion of the liquid within the pressure sensor. A chamber cover ay be disposed at an end of the chamber adjacent to the sensing element. The chamber cover can prevent molding material from entering into the chamber during molding. The chamber cover can also be configured to assist in fitting the plug into the pressure tube of the housing. For example, the chamber cover may be rigid or semi-rigid. Thus, the chamber cover can form an interference fit between the plug and the pressure tube.

The second compensating structure may be configured to control the freezing sequence of the liquid passed into the pressure sensor, so that the liquid adjacent to the sensing element is frozen prior to the liquid away from the sensing element. For example, the second compensating structure comprises a cavity formed between the sensing element and the pressure tube of the housing, wherein the cavity is in fluid communication with the communication passageway. Preferably, the cavity has a surface area to volume ratio greater than that of the communication passageway. In one embodiment, a ratio of the surface area to volume ratio of the cavity and the surface area to volume ratio of the communication passageway is in a range from 1.25:1 to 3:1. Typically, a ratio of the surface area to volume ratio of the cavity and the surface area to volume ratio of the communication passageway is about 2:1.

Preferably, the material used to form the cavity has an average thermal conductivity greater than that of the material used to form the communication passageway. A ratio of the average thermal conductivity of the material used to form the cavity and the average thermal conductivity of the material used to form the communication passageway can be about 35:1 or more.

In one embodiment of the pressure sensor, the pressure tube of the housing is formed with an inwardly extended flange, which is positioned between the sensing element and the communication passageway and formed with a communication hole used to constitute a portion of the communication passageway. Preferably, the communication passageway is elongated, which facilitates the deformation of the communication passageway while reducing the volume of the liquid contained.

In one embodiment of the pressure sensor, the compensating structure further comprises a third compensating structure which can be elastically deformed so as to maintain the liquid volume within the pressure sensor, wherein the third compensating structure comprises a mounting member, which is disposed on an outer side surface of the housing and is elastic, so that the mounting member can be elastically deformed so as to maintain the liquid volume within the pressure sensor when a force is applied to the pressure sensor due to the liquid volume expansion.

Another embodiment is directed to plug used with a pressure sensor. This pressure sensor comprises a housing formed with a pressure tube and a sensing element disposed within the housing, wherein a communication passageway is formed in the pressure tube and the sensing element is in fluid communication with an outside through the communication passageway. The plug is removably fitted in the pressure tube of the housing, and when a contact force is increased due to occurrence of a volume expansion of a liquid passed into the housing through the communication passageway, the plug is used to compensate the volume expansion. The plug may be formed with a through-hole which constitutes at least a portion of the communication passageway. A through-channel is formed on a perimeter of the plug, wherein the through-channel constitutes at least a portion of the communication passageway. A portion of the plug used to constitute the communication passageway can be deformed elastically to change the volume of the communication passageway.

In one embodiment of the plug, an enclosed chamber is formed in an interior of the plug. The chamber facilitates forming the plug during molding. Moreover, the chamber facilitates the portion used to form the communication passageway to be deformed, so as to compensate the volume expansion of the liquid within the pressure sensor. An annular boss can be formed at an end of the plug adjacent to the sensing element, wherein the annular boss is extended outwardly from the plug around the through-hole. The plug can also have a plurality of ribs formed in the chamber, wherein the plurality of ribs are extended in an axial direction and in a radial direction of the plug. A chamber cover may be disposed at an end of the chamber adjacent to the sensing element. The chamber cover facilitates to prevent a molding material from entering into the chamber during the molding.

In one embodiment of the plug, the chamber cover is configured to assist in fitting the plug into the pressure tube of the housing. For example, the chamber cover is rigid or semi-rigid, and is made of rigid or semi-rigid material, so as to facilitate to form an interference fit between the plug and the pressure tube. In one embodiment of the plug, the through-hole, the through-channel or the groove is elongated, which facilitates the deformation of the communication passageway while reducing the volume of the liquid contained. The material used to form the plug has a thermal conductivity less than the average thermal conductivity of the material used to form the sensing element and the pressure tube.

The present disclosure further relates to a method for manufacturing a plug for use with a pressure sensor. The method includes the steps of molding a body using elastomeric material, so that an enclosed chamber is formed in the interior of the body, placing a chamber cover onto the enclosed chamber so as to cover the enclosed chamber, and molding a secondary molding material onto the chamber cover. In one embodiment of the method, the method further comprises the step of fusing the body formed through the primary molding step and the portion formed through the secondary molding step, so as to form a complete housing and a sealed enclosed chamber. In the primary molding step, a plurality of ribs can be formed in the enclosed chamber, wherein the plurality of ribs are extended in an axial direction and in a radial direction of the plug.

In one embodiment of the method, in the primary molding step, a through-hole is formed in the body, or a through-channel is formed on a perimeter of the body.

In one embodiment of the method, in the secondary molding step, an annular boss is formed at an upper end of the body, wherein the annular boss is extended outwardly from the body around the through-hole. The secondary molding material may have a generally annular shape and is disposed around the through-hole.

As can be seen from the subject disclosure, the pressure sensor, a plug used with the pressure sensor and a method for manufacturing the plug according to the present disclosure have substantial technical advantages. One advantage is that volume expansion due to liquid freezing can be compensated to avoid the damage of the sensing element and other components by means of the deformation of the portion used to constitute the communication passageway to change the volume of the communication passageway, controlling the freezing sequence of the liquid within the cavity, or being provided with an elastic mounting flange, and the like. Even in the case of the most restrict enclosed freezing (e.g., a freezing under the liquid fully filling the space of an enclosed sensor), the volume expansion due to liquid freezing can be compensated effectively, so as to prevent the damage of the components of the pressure sensor.

Another advantage is that the plug can be suitable for different application requirements (e.g., temperature, medium, pressure or the like). From the above, it can be seen that it is possible for the plug material to be selected for the thermal conductivity or the like according to different application requirements. Still another advantage is that the rigid cover can provide advantageous fitting, so as to simplify the configuration. Advantageously, the flange can be made of plastic or metal sheet to also compensate at least partly the volume expansion due to liquid freezing.

Yet another advantage is that the plug is flexible, and thus can be used in applications with different configurations and sizes. From the above, it can be seen that the plug is an independent component mounted in the pressure tube, so that a suitable plug can be selected according to the configuration and size of the application, and the same plug can be used in other pressure sensors having the same size, which is universal. The plug does not need to be designed especially since it can be an optional accessory.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

The above and other features of the present disclosure will be more apparent and better understood from the following description in connection with the accompanying drawings, described below.

FIG. 2A is a perspective view of the plug according to an embodiment of the present disclosure.

FIG. 2B is a cross-sectional view of the plug according to an embodiment of the present disclosure.

FIG. 2C is a longitudinal section view of the plug according to an embodiment of the present disclosure.

FIGS. 4A-4D are schematic views of the pressure sensor and the plug according to another embodiment of the present disclosure.

FIGS. 5A-5B are schematic views of the pressure sensor and the plug according to another embodiment of the present disclosure.

FIGS. 7A-7D are schematic views showing the steps of forming the plug according to an embodiment of the present disclosure.

DETAILED DESCRIPTION OF THE PREFERRED EMBODIMENTS

The advantages, and other features of the technology disclosed herein, will become more readily apparent to those having ordinary skill in the art from the following detailed description of certain preferred embodiments taken in conjunction with the drawings which set forth representative embodiments of the present technology. It is noted that directional terms (e.g., up, down, left, right, horizontal, vertical etc.) are used below with respect to the figures and not meant in a limiting sense. Some embodiments of the present disclosure will be described now with respect to the accompanying drawings.

The present disclosure provides a pressure sensor, which is primarily used to measure the pressure of a liquid, and can prevent the components of the pressure sensor from being damaged when the liquid freezes, particularly under enclosed freezing of the liquid. For example, in a vehicle, in order to reduce the nitric oxides, a selective catalytic reduction system is generally used, wherein an aqueous urea solution is generally used as a working medium in the selective catalytic reduction system. The pressure sensor of the present disclosure can be applied to such selective catalytic reduction system, as an aqueous urea solution pressure sensor. The pressure sensor may not be damaged even in the case of a serious enclosed freezing. Of course, the pressure sensor of the present disclosure is not limited to the above application. In fact, one skilled in the art will appreciate that the above aqueous urea solution is only illustrative, and the pressure sensor of the present disclosure can be used to measure the pressure of a variety of liquids.

FIGS. 1A-1D show an exploded perspective view, a perspective view, a bottom exploded perspective view and a bottom perspective view of a pressure sensor 1 according to an embodiment of the present disclosure, respectively.

Figure 1B:
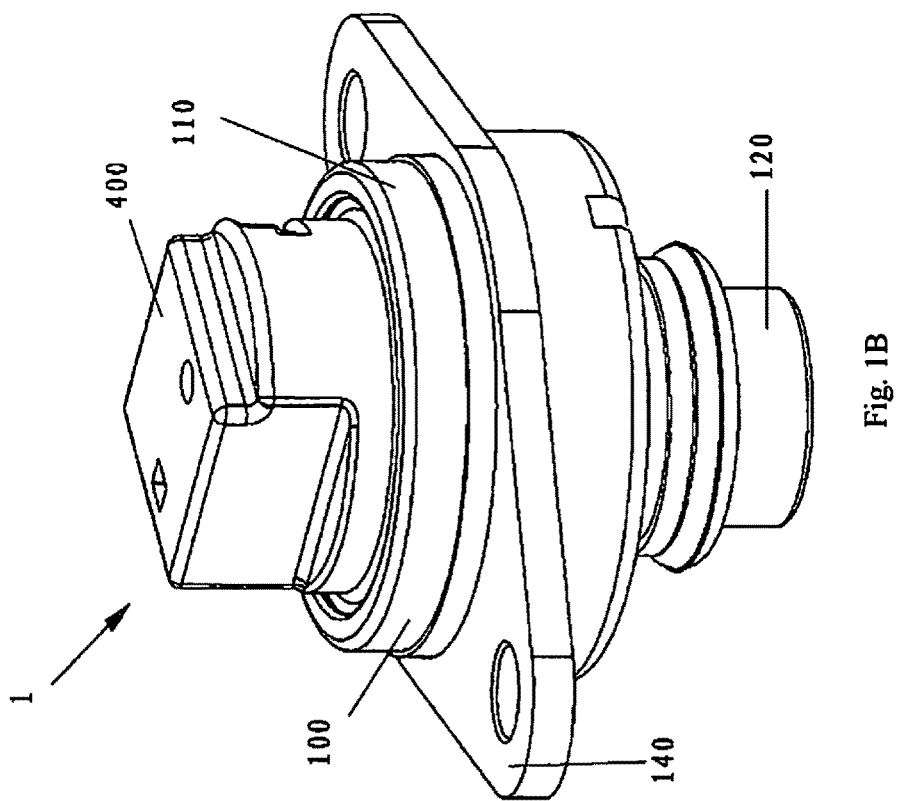
FIG. 1B is a perspective view of the pressure sensor according to an embodiment of the present disclosure.
Figure 1A:
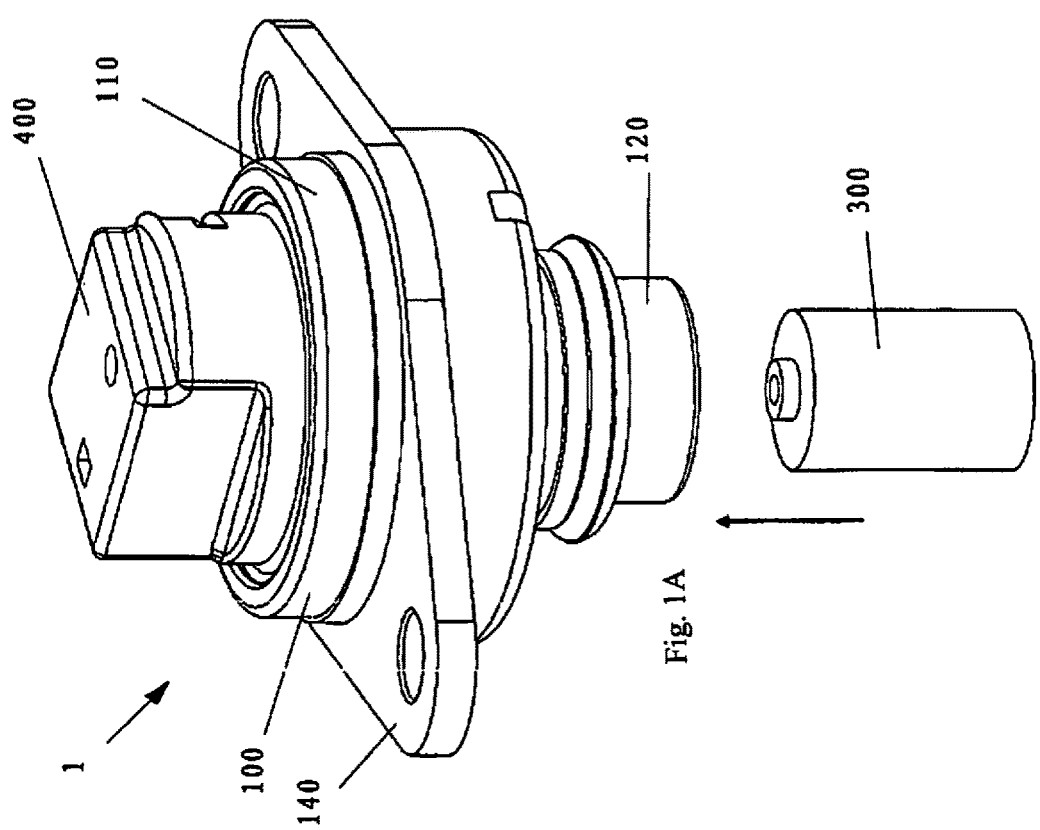
FIG. 1A is an exploded, perspective view of the pressure sensor according to an embodiment of the present disclosure.
Figure 1D:
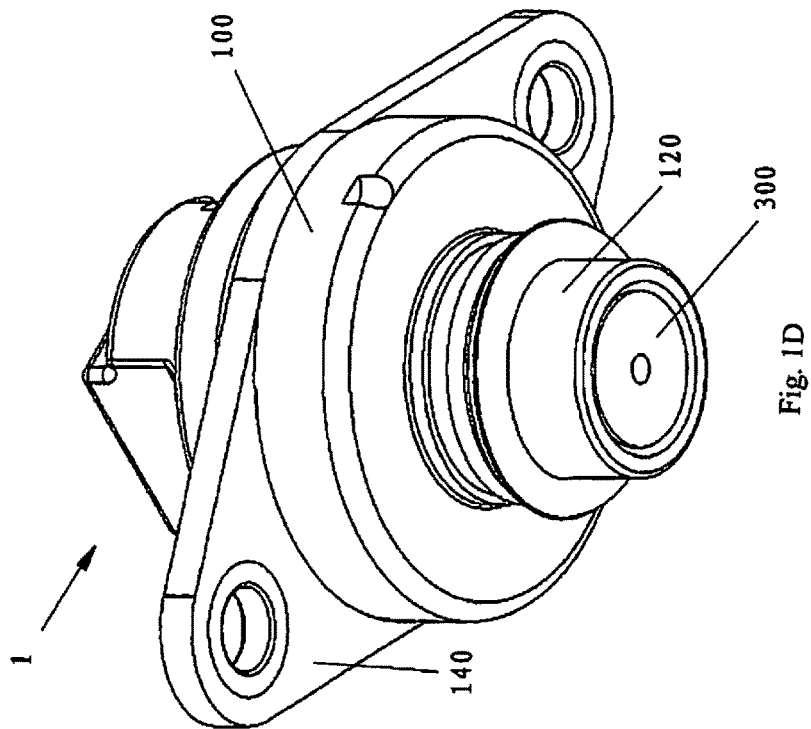
FIG. 1D is a bottom perspective view of the pressure sensor according to an embodiment of the present disclosure.
Figure 1C:
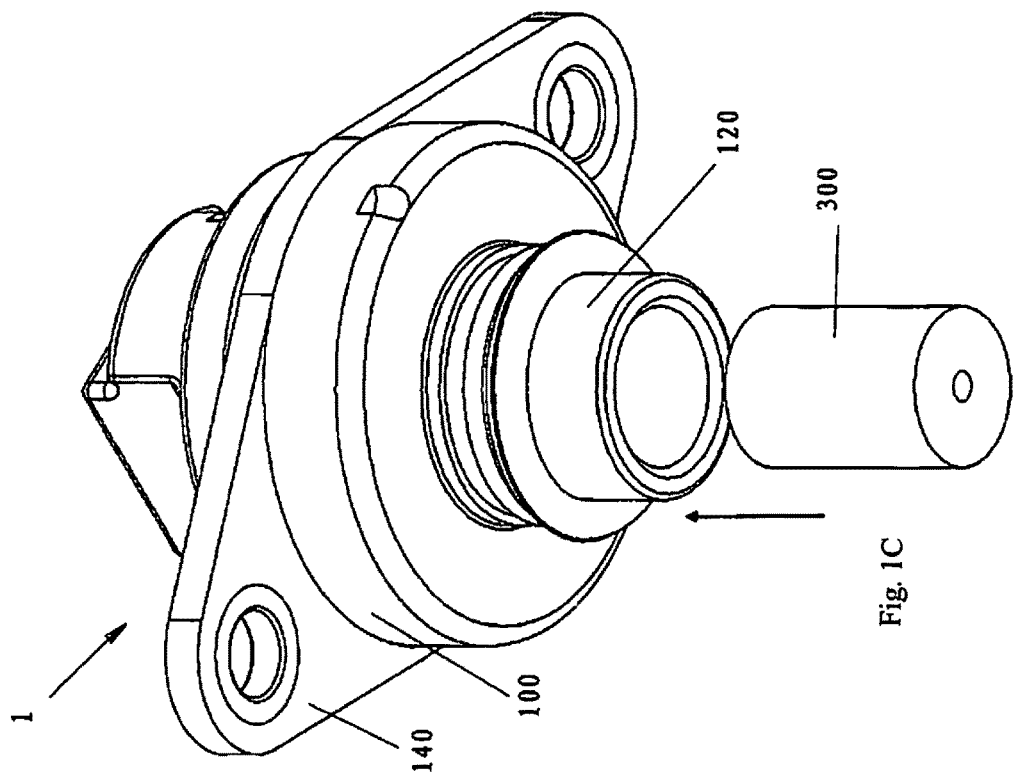
FIG. 1C is a bottom exploded, perspective view of the pressure sensor according to an embodiment of the present disclosure.
Figure 3:
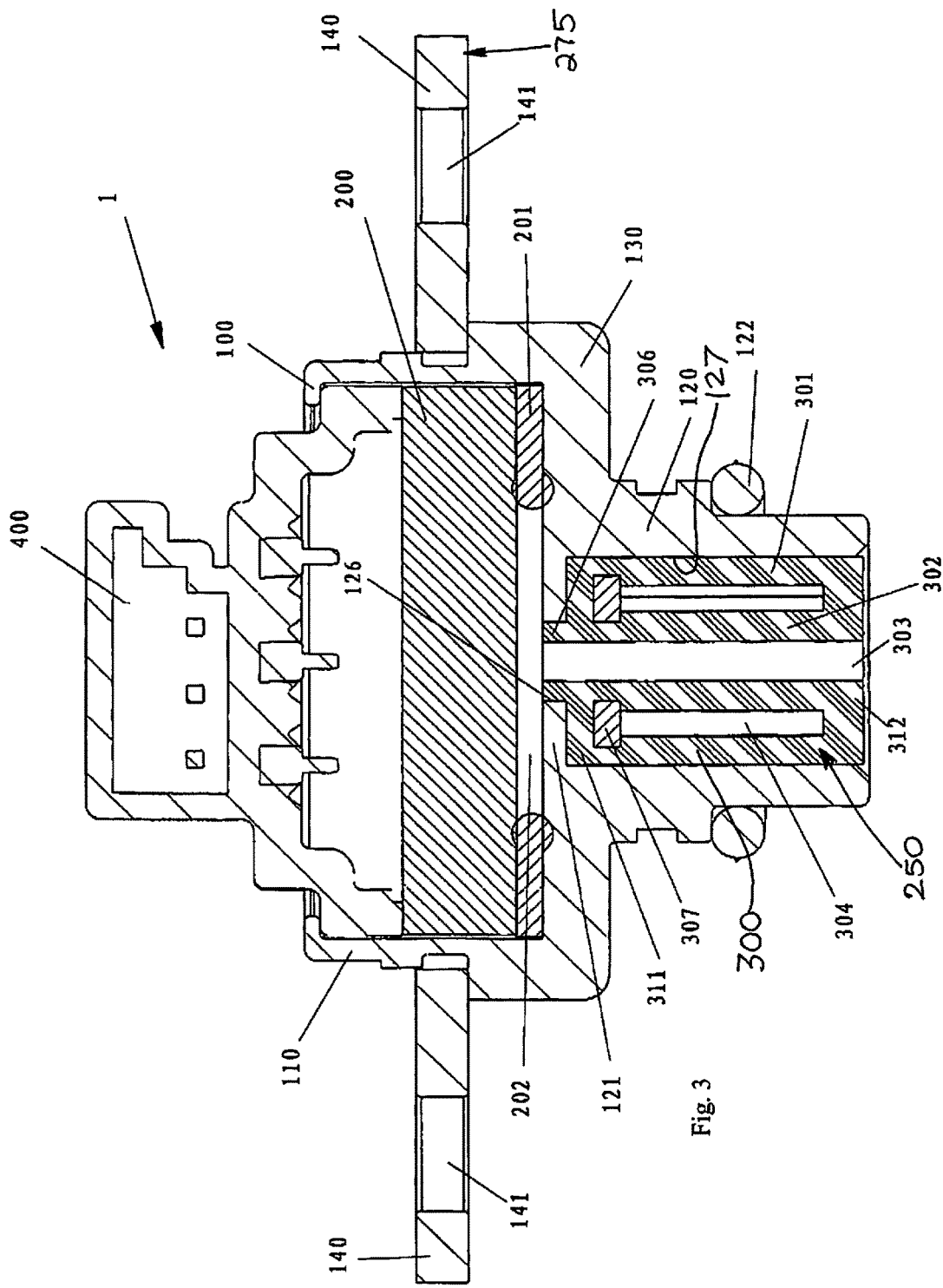
FIG. 3 is a cross-sectional view of the pressure sensor according to an embodiment of the present disclosure.
Figure 4B:
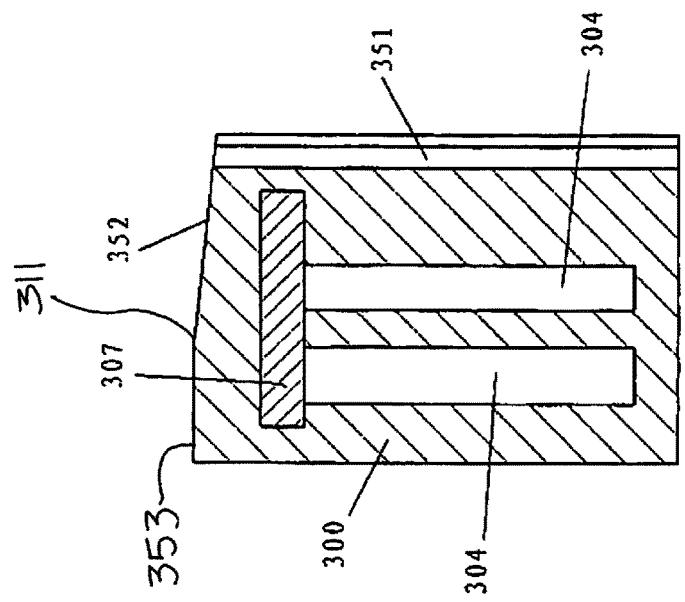
Figure 4A:
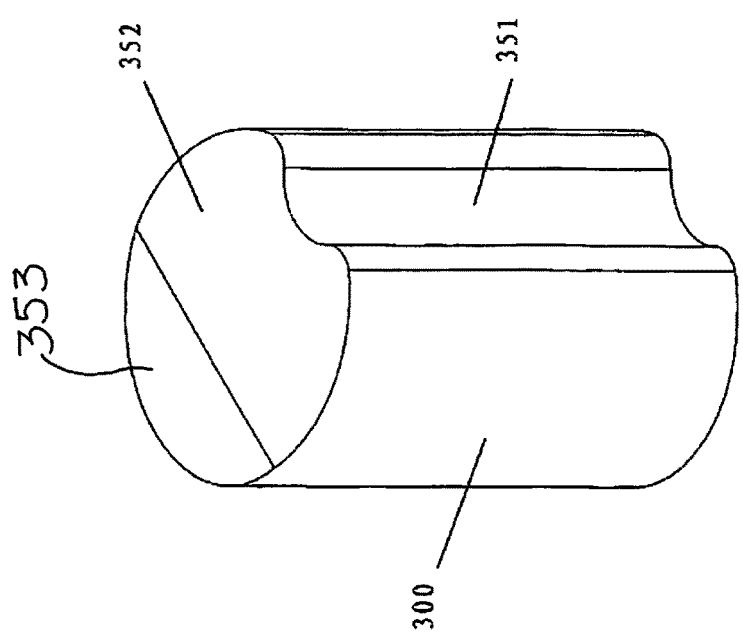

As illustrated, a pressure sensor 1 according to an embodiment of the present disclosure comprises in generally a housing 100 and a sensing element 200 (which is not illustrated in FIGS. 1A-1D, but can refer to FIG. 3). The sensing element 200 is mounted in the housing 100.

FIG. 3 a cross-sectional view of the pressure sensor 1 according to an embodiment of the present disclosure. Referring to FIG. 3, a housing cavity 110 is formed at an upper portion of the housing 100. In the illustrated embodiment, the housing cavity 110 is generally cylindrical, but not limited to this. One skilled in the art will appreciate that the housing cavity can also be rectangular, square, conical and other regular or irregular shape. The sensing element 200 is contained in the housing cavity 110. During operation, the sensing element 200 is in contact with the liquid (e.g., aqueous urea solution), so as to sense the pressure of the liquid.

Typically, the sensing element 200 is fixedly disposed in the housing 100, that is, the sensing element 200 is fixed with respect to the housing 100, so as to form a rigid enclosed configuration together with other components. In the illustrated embodiment, the sensing element 200 is rigidly secured in the housing cavity 110.

The pressure sensor 1 further comprises an electrical connection 400, which is disposed on the sensing element 200 and is electrically connected to the sensing element 200, so as to transmit the pressure signs sensed by the sensing element 200.

A pressure tube 120 is formed on a lower portion of the housing 100. In the illustrated embodiment, the pressure tube 120 is also generally cylindrical, but not limited to this. One skilled in the art may design other shapes of the pressure tube if desired, including, but not limited to rectangular, square, conical or the like. The pressure tube 120 has a size less than that of the housing cavity 110, so that a shoulder 130 is formed between the pressure tube 120 and the housing cavity 110. The sensing element 200 is positioned adjacent to the shoulder 130.

In a preferable embodiment, an inner seal 201 is provided between the sensing element 200 and the shoulder 130, so as to prevent the liquid (e.g., aqueous urea solution) from leaking to the electrical connection 400 through the sensing element 200 in the housing cavity 110.

A communication passageway 127 is formed by the pressure tube 120, and the sensing element 200 is in fluid communication with an outside through the communication passageway 127. During the operation of the pressure sensor 1, the pressure sensor 1 is in contact with the liquid to be measured. A portion of the liquid to be measured is passed into the pressure sensor 1 to be in contact with the sensing element 200, so that the sensing element 200 can be used to measure the pressure of the liquid. In particular, the liquid is passed into the pressure sensor 1 through the communication passageway 127 to be in contact with the sensing element 200, so that during the operation of the pressure sensor 1, there is liquid in the communication passageway 127, and the sensing element 200 is in contact with the liquid to measure the pressure of the liquid.

In one embodiment, the pressure tube 120 itself forms with the communication passageway 127. The liquid to be measured is passed into the pressure sensor 1 directly through the pressure tube 120, and is in contact with the sensing element 200. In other embodiments, other structures can be used to form the communication passageway, which will be described further in detail hereafter.

When the operation environment of the pressure sensor 1 is changed, for example when the temperature is decreased, the liquid to be measured may be frozen (e.g., icing). One skilled in the art will appreciate that the freezing of the liquid will generally cause a volume expansion for example. It is likely for such volume expansion to damage the components in contact with the liquid, for example the sensing element 200, and thus damage the pressure sensor 1.

Therefore, according to the present disclosure, the pressure sensor 1 is further provided with a compensating structure 250, so that when there is occurrence of a volume change of a liquid passed into the pressure sensor 1 through the communication passageway, the compensating structure 250 is used to compensate the volume change. For example, as described above, when the liquid to be measured is frozen due to low temperature, the volume of the liquid expands. The compensating structure 250 of the pressure sensor 1 can compensate such volume expansion, so as to avoid the damage of the components in contact with the liquid. However, the one skilled in the art will appreciate that it is only illustrative that the volume change is caused by low temperature. The compensating structure of the pressure sensor according to the present disclosure can also be used to compensate the liquid volume change caused by other factors.

According to a principle of the present disclosure, the compensating structure 250 can be achieved in many ways, at least including a first compensating structure 250 configured to change (e.g., increase) the volume of the communication passageway 127. A second compensating structure 2# is configured to control the freezing sequence of the liquid passed into the pressure sensor. A third compensating structure configured 3# to maintain the liquid volume within the pressure sensor. The three compensating structures may be used together or separately.

When there is a volume change of the liquid passed into the pressure sensor 1, these compensating structures are all used to compensate such volume change, although the compensating structures have different structures and principles. These illustrative compensating structures will be described in detail below. One skilled in the art will appreciate that these compensating structures can function independently or combine to obtain a better compensating effect. Meanwhile, one skilled in the art will appreciate that these compensating structures are only illustrative and not limited. Other compensating ways are possible without departing from the spirit and scope of the present disclosure.

In an embodiment of the present disclosure, the first compensating structure 250 can comprise a plug 300. An embodiment of the plug 300 as a compensating structure will be described in detail below.

The plug 300 is removably fitted in the pressure tube 120 of the housing 100. The plug 300 has a shape generally mated with the shape of the pressure tube 120 and/or the communication passageway 127, that is in the illustrated embodiment, the plug 300 is also generally cylindrical, but not limited to this. The one skilled in the art may design other shapes of the plug if desired, including, but not limited to rectangular, square, conical or the like.

FIGS. 2A-2C show a perspective view, a cross-sectional view and a longitudinal section view of the plug 300 according to an embodiment of the present disclosure, respectively. The plug 300 includes a top or first end 311, a bottom or second end 312 and an outer side wall 301 extended between the first end 311 and the second end 312. The first end 311, the second end 312 and outer side wall 301 constitute a generally cylindrical shape.

The plug 300 is formed with a through-hole 303, which extends in an axial direction of the plug 300. The through-hole 303 constitutes at least a portion of the communication passageway 127. The liquid to be measured is passed into the pressure sensor 1 through the through-channel 303, and is in contact with the sensing element 200. In one embodiment, the communication passageway is comprised of the through-hole 303, so that the liquid is passed into the pressure sensor 1 directly through the through-channel 303. In other embodiments, the through-hole 303 may be used to form the communication passageway together with other structures, which will be described further in detail hereafter.

In the illustrated embodiment, the through-hole 303 is formed at the center of the plug 300. However, this is only illustrative, and the one skilled in the art will appreciate that the position of the through-hole 303 is not limited to the center of the plug 300. The through-hole can be positioned at other positions of the plug 300, so as to for example be offset from the longitudinal axis of the plug 300. It is possible to select the position of the through-hole 303 according to requirements.

The portion of the plug 300 used as a portion of the communication passageway 127 can be deformed elastically, so that when the liquid passed into the pressure sensor 1 through the communication passageway 127 (in particular, through the plug 300) has been changed in volume (e.g., a volume expansion caused by freezing of the liquid in the pressure sensor 1), this portion of the plug 300 is deformed elastically to change the volume of the communication passageway, so as to compensate such volume change of the liquid.

A hole wall 302 forms the through-hole 303, which is located radially inside of the outer side wall 301. The hole wall 302 is connected with the outer side wall 301 at the first end 311 and the second end 312, so that one or more hollow enclosed chambers 304 are formed between the hole wall 302 and the outer side wall 301. That is, an enclosed chamber 304 is formed in an interior of the plug 300. A function of such chamber(s) 304 in the interior is used to receive the deformation of the communication passageway 127, for example the deformation of the through-hole 303 in this embodiment. As a result, pressure from expanding fluid volume is harmlessly relieved.

For example, as for the embodiment of FIG. 3, when the volume of the liquid is increased due to freezing and thus the liquid in the through-hole 303 has an increased volume, the hole wall 302 can be deformed electrically such as in radial direction of the plug in the orientation of the figure, so as to increase the volume of the through-hole 303, the volume used to contain the liquid, and thus compensate the volume expansion of the liquid. When the hole wall 302 is deformed, such deformation can be received by the chamber 304, so that the hole wall 302 can be further deformed more easily and quickly.

In a preferable embodiment, the enclosed chamber 304 can be formed within the communication passageway 127, such as around the through-hole 303, so as to receive the deformation of the hole wall 302.

During the molding of the plug 300, in order to facilitate the molding and demolding of the outer side wall 301 and the hole wall 302, a plurality of ribs 305 are connected between the hole wall 302 and the outer side wall 301, in the chamber 304. The plurality of ribs extend in the axial direction and the radial direction of the plug 300. These ribs 305 can be arranged symmetrically around the hole wall 302 to facilitate the molding of the plug 300.

As shown in FIG. 2C, in the chamber 304, a chamber cover 307 is provided at an upper end of the chamber 304 adjacent to the sensing element 200, that is between the first end 111 and the ribs 305, wherein the chamber cover 307 is used to prevent the molding materials getting into the chamber 304 during the molding of the plug 300.

Referring to FIG. 3, when the plug 300 is fitted in the pressure tube 120, the first end 311 of the plug 300 is positioned adjacent to the sensing element 200, and the second end 312 is positioned away from the sensing element 200. In this case, as shown in FIG. 3, the through-hole 303 is positioned perpendicularly with respect to the sensing element 200, and the sensing element 200 is in communication with the outside of the pressure sensor through the through-hole 303.

A cavity 202 is formed between the sensing element 200 and the pressure tube 120. As for the embodiment of FIG. 3, the cavity 202 is formed below the sensing element 200, between the sensing element 200, the housing 100 and the plug 300. The cavity 202 is in communication with the through-hole 303. When the pressure sensor 1 is mounted in a selective catalytic reduction system, the liquid is passed into the cavity 202 through the through-hole 303, and thus into contact with the sensing element 200, so that the pressure of the liquid can be measured by the pressure sensor 1. However, one skilled in the art will appreciate, the cavity 202 is not necessary, and the liquid can be in contact with the sensing element 200 directly after passing through the through-hole 303. The cavity 202 is another form of compensating structure, which will be described in detail below.

According to an embodiment of the present disclosure, the hole wall 302 used to form the through-hole 303 can be deformed, so as to change the volume of the through-hole 303. In one embodiment, the hole wall 302 is made of an elastically deformable material, including but not limited to rubber, plastic or thermoplastic material. As such, when the ambient temperature is at −11° C. or less, the liquid to be measured (e.g., aqueous urea solution) will freeze, causing the volume of the liquid within the through-hole 303 and the cavity 202 to be increased. If the plug 300 is also a rigid structure, the expanded liquid will apply an increased contact force to the sensing element 200, so as to result in the damage of at least the sensing element 200. Indeed, it is possible for the components of the pressure sensor 1 in contact with the liquid to be damaged due to the increased contact force. In an embodiment of the present disclosure, the hole wall 302 is deformable, so that in the case of the volume of the liquid increasing due to being frozen, the hole wall 302 is deformed to increase the volume of the through-hole 303, i.e. increase the amount of the liquid contained in the through-hole 303, so as to compensate the increased volume of the liquid due to being frozen and thus prevent the damage of the components of the pressure sensor 1 caused by the increased contact force.

It can be seen from the above that even in the case of the above rigid enclosed configuration (which may cause an enclosed freezing), the configuration of the plug 300 can compensate the increased volume of the liquid, so as to prevent the damage of the components of the pressure sensor 1.

As for a particular embodiment, referring to FIG. 3, when the liquid is frozen, the increased volume of the liquid will apply axially a contact force to the sensing element 200. However, since the sensing element 200 is rigidly connected and the hole wall 302 is elastically deformable, the liquid having increased volume will press the hole wall 302 firstly and cause the hole wall 302 to be deformed radially. At this time, since the chamber 304 is formed in the plug 300, the hole wall 302 can be deformed radially and outwardly, so that the through-hole 303 has an increased volume to compensate the increased volume of the liquid and thus prevent the damage of the components of the pressure sensor 1, particularly the sensing element 200.

Of course, it is not limited to the above configuration for the contact force applied due to the increased volume of the liquid and for the corresponding deformation of the hole wall, that is, it is not necessary to apply an axial force to the sensing element and for the hole wall to be deformed radially. Indeed, according to the present disclosure, when the volume of the liquid is increased, the damage of the components of the pressure sensor can be prevented as long as portion of the plug such as the hole wall is deformed to make the through-hole be expanded and thus can compensate the volume expansion. Moreover, the through-hole 303 can be elongated, which facilitates the deformation of the hole wall 302, while reducing the volume of the liquid contained (and in turn can reduce the volume expansion of the liquid when being frozen).

FIGS. 4A-4D show a pressure sensor and a plug according to another embodiment of the present disclosure. The structure of this embodiment is generally similar as that shown in FIG. 3, except for the portion of the plug 300 used to constitute the communication passageway 127. Accordingly, the same parts of the embodiment in FIGS. 4A-4D as those in FIG. 3 will be not described in detail here, and only the different portions will be described.

In the embodiment of FIGS. 4A-4D, a through-channel 351 is formed on the perimeter of the plug 300, wherein the through-channel 351 constitutes at least a portion of the communication passageway 127. The through-channel 351 is also elongated, which facilitates the deformation of the through-channel 351 while reducing the volume of the liquid contained in the communication passageway 127.

In a further embodiment, the top end 311 has a sloped portion 352 and a flat portion 353 adjacent to the sensing element 200. It can be seen in connection with FIG. 4D that the sloped portion 352 also constitutes a portion of the communication passageway 127, wherein the liquid is passed into the pressure sensor 1 through the through-channel 351 and the sloped portion 352, and is in contact with the sensing element 200. However, the one skilled in the art will appreciate that the sloped portion is not necessary, and only used to facilitate mating with common pressure tube 120. It is also optional to have distinct chambers 304 as shown in FIG. 4D. Alternatively, a single large chamber 304, which may or may not be centrally located, can be provided.

FIGS. 5A-5B show a pressure sensor 1 and a plug 300 according to another embodiment of the present disclosure. This embodiment shows another form of the compensating structure. A groove 125 is formed on an inner wall of the pressure tube 120. Thus, the plug 300 is not provided with a through-hole or a through-channel. Indeed, in this case, the plug 300 itself cooperates with the groove 125 so as to constitute at least a portion of the communication passageway 127. As shown in FIG. 5B, the liquid is passed into the pressure sensor 1 via the groove 125, and is in contact with the sensing element 200. The groove 125 can also be preferably elongated, which facilitates the deformation of the portion of the plug 300 cooperated with the groove 125 while reducing the volume of the liquid contained. The pressure sensor 1 includes an outer seal ring 122 to facilitate sealing engagement to a desired location.

Another compensating structure according to the present disclosure, i.e. controlling the freezing sequence, will be described now. This compensating structure is configured to control a freezing sequence of the liquid passed into the pressure sensor, so that the liquid adjacent to the sensing element is frozen prior to the liquid away from the sensing element 200. In this manner, the liquid adjacent to the sensing element will be frozen firstly, and the resulting volume expansion will force a portion of the liquid out of the communication passageway. Therefore, the volume of the liquid within the pressure sensor and the frozen liquid will not be increased, and thus no damage the components of the pressure sensor 1 in contact with the liquid. Further, the liquid adjacent to the sensing element 200 will be frozen firstly, and thus the frozen liquid will act to protect the sensing element 200 so that the volume expansion caused by the subsequently frozen liquid has no effect to the sensing element 200, which further prevents the sensing element from being damaged due to the volume expansion.

This compensating structure comprises the cavity 202 formed between the sensing element 200 and the pressure tube 120. The cavity 202 is in fluid communication with the communication passageway 127. The cavity 202 has a surface area to volume ratio greater than the surface area to volume ratio of the communication passageway 127. Thus, the liquid in the cavity 202 will freeze first to accomplish the desired benefits.

In order to further prevent the damage to the components of the pressure sensor 1 caused by the volume expansion due to the frozen liquid, control of the freezing sequence of the liquid within the pressure sensor can be considered. For example, the effect of the frozen liquid to the components of the sensor can be further reduced, if the liquid in the cavity 202 is frozen first and then the liquid in the through-hole 303 (FIG. 3) is frozen.

Figure 6A:
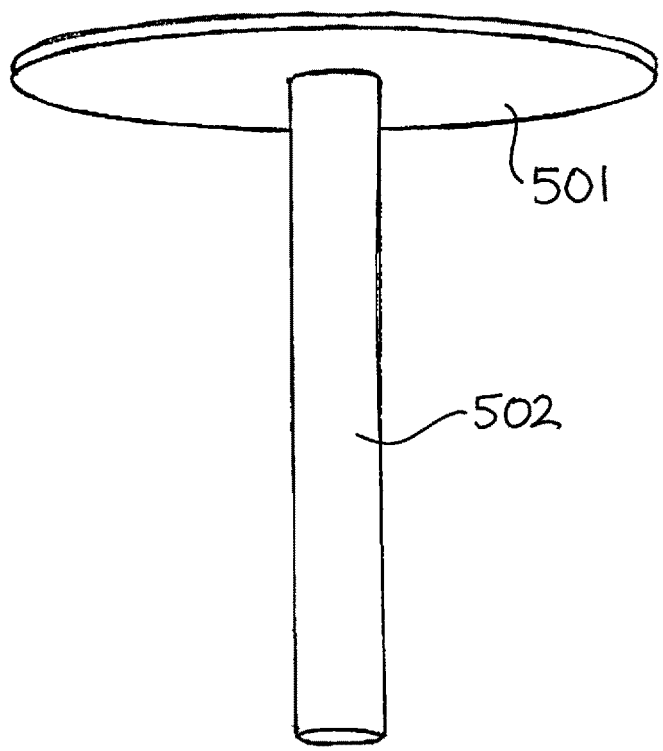
FIG. 6A is a schematic view showing the general shape of the liquid frozen in the pressure sensor according to an embodiment of the present disclosure.
Figure 6B:
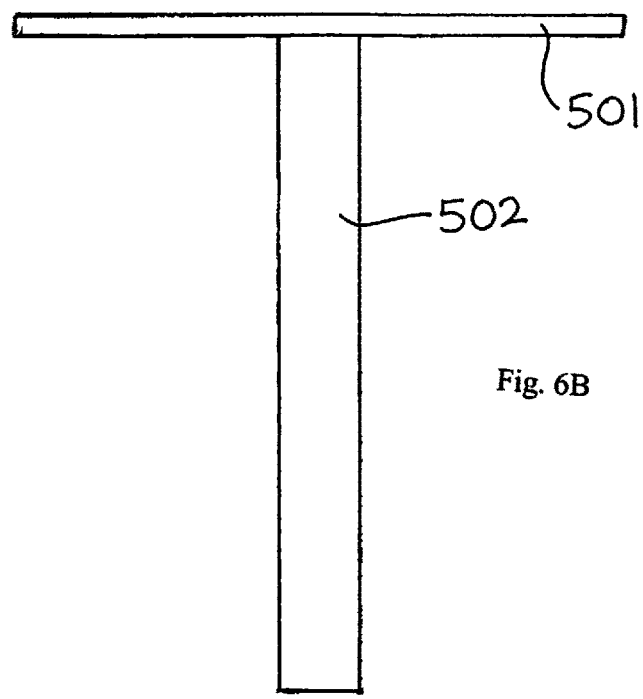
FIG. 6B is a schematic view showing the general shape of the liquid frozen in the pressure sensor according to an embodiment of the present disclosure.

In particular, referring to FIGS. 6A and 6B, these figures show schematic views of the frozen portion formed by the frozen liquid in the structure of FIG. 3. When the liquid is frozen in the structure of FIG. 3, the resulting frozen portion can be divided into two portions, a first frozen portion 501 and a second frozen portion 502. The first frozen portion 501 is a frozen liquid portion in the cavity 202, and the second frozen portion 502 is a frozen liquid portion in the through-hole 303. Accordingly, the first frozen portion 501 has a shape corresponding to that of the cavity 202, and the second frozen portion 502 has a shape corresponding to that of the through-hole 303. In this case, FIGS. 6A and 6B show a shape corresponding to that of the cavity 202 and the through-hole 303.

For a simplified illustration, now it will be described how to control the freezing sequence based on the configuration of the cavity 202 and the through-hole 303 shown in FIG. 3.

The first frozen portion 501 and the second frozen portion 502 are all generally cylindrical. Assuming the first frozen portion 501 has a radius of R and a height of x, the first frozen portion 501 has a surface area of $2 \cdot \pi R^2 + 2\pi R \cdot x$ and a volume of $\pi R^2 \cdot x$, and thus the first frozen portion 501 has a surface area to volume ratio of:

$$\frac{2 \cdot \pi R^2 + 2\pi R \cdot x}{\pi R^2 \cdot x} = \frac{2}{x} + \frac{2}{R}$$

Likewise, assuming the second frozen portion 502 has a radius of r and a height of h, the second frozen portion 502 has a surface area of $2 \cdot \pi r^2 + 2\pi r \cdot h$ and a volume of $\pi r^2 \cdot h$, and thus the second frozen portion 502 has a surface area to volume ratio of:

$$\frac{2 \cdot \pi r^2 + 2\pi r \cdot h}{\pi r^2 \cdot h} = \frac{2}{h} + \frac{2}{r}$$

In most sensor applications, the dashed block in the above two equations can be considered as a constant value due to the size of the sensor. In general, R is less than h. accordingly, through selecting the size of x and r, such as x<r, it is possible that the surface area to volume ratio of the first frozen portion 501 is greater than the surface area to volume ratio of the second frozen portion 502. If x is much less than r, it is possible that the surface area to volume ratio of the first frozen portion 501 is much greater than the surface area to volume ratio of the second frozen portion 502, that is $$\frac{2}{x} + \frac{2}{R} \gg \frac{2}{h}$$

Correspondingly, the surface area to volume ratio of the cavity 202 is greater than the surface area to volume ratio of the through-hole 303. Alternatively, the surface area to volume ratio of the cavity 202 is much greater than the surface area to volume ratio of the through-hole 303.

As for a common pressure sensor, R can be about 1 to 15, x can be about 0.2 to 5, r can be about 0.25 to 15, h can be 0.5 or 20. In such sensor, a ratio of the surface area to volume ratio of the cavity 202 and the surface area to volume ratio of the through-hole 303 can be preferably in a range from 1.25:1 to 3:1, which can obtain a good control to the freezing sequence of the liquid.

In a particular embodiment, R can be 4.5, x can be 0.5, r can be 1, and h can be 10. As such, a ratio of the surface area to volume ratio of the cavity 202 and the surface area to volume ratio of the through-hole 303 is on the order of 2:1.

The surface area to volume ratio can be used as a measurement to show the speed of heat transfer (cooling) of the liquid per unit volume (mass), and the more the value of this ratio is, the quicker the speed of heat transfer will be, and thus the liquid will be frozen quickly (in the case that the thermal conduction factor difference of the contact interface is not taken into consideration). Accordingly, through the above configuration, the liquid in the cavity 202, that is the liquid adjacent to the sensing element 200, can be frozen first, and then the liquid in the through-hole 303 is frozen.

In the case that the liquid in the cavity 202 is frozen first, the volume expansion due to the frozen liquid can be compensated partly, since the liquid in the through-hole 303 has not yet been frozen, so that the volume of the cavity 202 will not be increased. Accordingly, the frozen liquid will not apply an increased contact force to such as the sensing element 200, so as to prevent the damage of the components of the pressure sensor 1.

The above describes that the compensating structure is used to control the freezing sequence to compensate the volume expansion due to the frozen liquid, based on the embodiment of FIG. 3. The one skilled in the art will appreciate that the compensating structure used to control the freezing sequence can also adapted to other embodiments, such as the embodiments of FIGS. 4A-4D and 5A-5B, wherein the above technical effect can be achieved through the surface area to volume ratio of the cavity 202 greater than the surface area to volume ratio of the through-channel 351, or greater than the surface area to volume ratio of the groove 125. In the case that the pressure tube 120 is provided with a flange 121 which is provided with a communication hole 126, the above technical effect can also be achieved through the surface area to volume ratio of the cavity 202 greater than the surface area to volume ratio of the through-hole 303, the through-channel 351 or the groove 125, as well as the surface area to volume ratio of the communication hole 126.

In addition to or as an alternative to provide the surface area to volume ratio of the cavity greater than the surface area to volume ratio of the communication passageway to control the freezing sequence, in a preferable embodiment, the freezing sequence of the liquid contained in the pressure sensor can be controlled through selecting the materials for the component of the pressure sensor. In particular, the freezing sequence of the liquid can be controlled through the thermal conductivity of the cavity greater than the thermal conductivity of the communication passageway.

Herein, the thermal conductivity of the cavity refers to an average thermal conductivity of the portion of the cavity in contact with the liquid (that is, an average thermal conductivity of the material(s) used to form the cavity), and the thermal conductivity of the communication passageway refers to an average thermal conductivity of the portion of the communication passageway in contact with the liquid (that is, an average thermal conductivity of the material(s) used to form the communication passageway).

For example, through the selection of the materials, the average thermal conductivity of the portion(s) adjacent to the cavity 202 is greater than the average thermal conductivity of the portion(s) adjacent to the through-hole 303. As such, the thermal conductivity of the portions adjacent to the cavity 202 is high and thus the heat can be transferred quickly, so that the liquid in the cavity 202 is frozen first, and the thermal conductivity of the portions adjacent to the through-hole 303 is low and thus the heat can be transferred slowly, so that the liquid in the through-hole 303 will be frozen subsequently. As a result, the freezing sequence of the liquid contained in the pressure sensor 1 can be controlled in accordance with the subject technology.

In particular, as for an embodiment of the present disclosure, such as the embodiment shown in FIG. 3, the average thermal conductivity of the material(s) used to form the sensing element 200 and the housing 100 is greater than the thermal conductivity of the material(s) used to form the plug 300, or otherwise the thermal conductivity of the material(s) used to form the plug 300 is less than the average thermal conductivity of the material(s) used to form the sensing element 200 and the housing 100. For example, the sensing element 200 and the housing 100 can be made of metal or plastic having high thermal conductivity, or can be formed by ceramics or semiconductor material, and the plug 300 can be made of rubber or plastic having low thermal conductivity. In the case of the seal 201, the seal 201 is made of such as rubber. As such, the average thermal conductivity of the material(s) used to form the cavity is greater than the average thermal conductivity of the material(s) used to form the communication passageway.

In a particular embodiment, the materials used to form the portions in contact with the liquid are selected as follows. The sensing element 200 is made of ceramics, the seal 201 is made of rubber, the pressure tube 102 is made of metal, and the plug 300 is made of rubber, so that a ratio of the average thermal conductivity of the material(s) of the portions used to form the cavity and the average thermal conductivity of the material(s) of the portions used to form the communication passageway is about 35:1, that is, a ratio of the average thermal conductivity of the cavity and the average thermal conductivity of the communication passageway is about 35:1. In this case, it is enough to ensure the liquid adjacent to the sensing element is frozen first. If the ratio of the average thermal conductivity of the cavity and the average thermal conductivity of the communication passageway is greater than 35:1, it is more easily to ensure that the liquid adjacent to the sensing element is frozen first, so as to prevent the damage of the sensing element.

It can be seen from the above that the cavity 202 is formed between the sensing element 200, the housing 100 and the plug 300, that is a portion of the plug 300 is used to form the cavity 202. In the embodiment of FIG. 3, the surface of the first end 311 of the plug 300 is used to form a portion of the cavity 202. In this case, a portion of the liquid in the cavity 202 will be in contact with the first end 311 of the plug 300, so that the freezing speed of this portion becomes slower due to the material of the plug 300. In order to further enhance the effect brought by controlling the freezing speed, the following means can be considered.

The pressure tube 120 of the housing 100 is formed with an inwardly extended flange 121, which is positioned between the sensing element 200 and the communication passageway 127. A communication hole 126 is formed in the flange 121, wherein the communication hole 126 constitutes a portion of the communication passageway 127. For example, in the case of the above embodiment, the liquid is passed through the through-hole 303, the through-channel 351 or the groove 125, into the pressure sensor 1, and further through the communication hole 126 in the flange 121, so as to be in contact with the sensing element 200.

In the case that the plug 300 is formed with the through-hole 303, an annular boss 306 is formed at the first end 311 of the plug 300 around the through-hole 303, and extends outwardly from the first end 311. The flange 121 covers the first end 311 of the plug 300 around the annular boss 306 of the plug 300. As such, the annular boss 306 and the flange 121 replace the first end 311 to form a portion of the cavity 202. As such, during the operation, the amount of the liquid in the cavity 202 in contact with the plug 300 is reduced substantially. However, the above annular boss 306 is not necessary. If there is no the annular boss 306, the flange 121 can more fully or even fully cover the plug 300, as shown in FIGS. 4D and 5B. The flange 121 can be made of a material having high thermal conductivity, e.g., metal or plastic having high thermal conductivity. Therefore, the thermal conductivity of the portions in contact with the liquid in the cavity 202 can be further increased, so as to further enhance the effect brought by controlling the freezing speed.

Of course, the effect of controlling the freezing speed can be enhanced through not only the above means but also other ways. For example, in order to reduce the portions of the plug in contact with the liquid in the cavity, the first end of the plug can be a two parts design, that is, an annular boss is formed at the first end of the plug around the through-hole and extends outwardly from the first end, meanwhile such as a metal cover is provided around the annular boss to cover the first end of the plug and is fixedly connected to the first end.

In the case that the plug is made of such as rubber, since the rubber is elastic, it is possible for the plug to be disengaged from the pressure tube when the plug is fitted into the pressure tube of the housing. To this end, the chamber cover 307 is rigid or semi-rigid, e.g., can be made of a rigid or semi-rigid material, including but not limited to rubber, plastic, metal, ceramics and the like. The rigid or semi-rigid chamber cover 307 abuts against the outer side wall 301 and applies an outwardly radial force to the outer side wall 301 so as to press the outer side wall 301. As such, in the case that the plug 300 is removably fitted into the pressure tube 120, an interference fit will be formed between the plug 300 and the pressure tube 120, so as to facilitate the plug 300 being closely fitted into the pressure tube 120 of the housing 100, to substantially reduce the risk of the plug 300 being disengaged from the pressure tube. In this case, no additional mating structure is needed to ensure the close fitting between the plug and the pressure tube.

In addition to the above first and second compensating structure, other compensating structure can be provided according to the embodiment of the present disclosure, such as a third compensating structure. Referring to FIG. 3, the third compensating structure can comprise a mounting member 275, which is used for mounting the pressure sensor 1. The mounting member 275 is disposed on an outer side surface of the housing 100 of the pressure sensor 1. The mounting member 275 is elastic, so that when a force is applied to the pressure sensor 1 (e.g., the volume expansion caused by the frozen liquid in the pressure sensor 1 will apply a force to the pressure sensor 1), the mounting member 275 can be deformed elastically, so as to maintain the volume of the liquid in the pressure sensor 1.

The mounting member 275 can be achieved in many ways to be elastically deformable to compensate the volume expansion caused by the frozen liquid. For example, the mounting member 275 can be a form of a mounting flange 140. The third compensating structure of the present disclosure now will be described by an example of the mounting flange 140. However, the one skilled in the art will appreciate that the mounting member 275 is not limited to the mounting flange 140.

As illustrated, in a preferred embodiment of FIG. 3, a mounting flange 140 is provided on the outer side surface of the housing 100 as the third compensating structure. For example, the mounting flange 140 is provided on the outer side surface of the housing cavity 110 of the housing 100. The mounting flange 140 is elastic, and can be made of an elastomer, e.g., can be made of plastic or metal, so that the mounting flange 140 can be deformed elastically when a force is applied to the pressure sensor 1.

A mounting hole 141 is formed on the mounting flange 140. The pressure sensor 1 is mounted onto such as a selective catalytic reduction system, via a fastener (not shown) through the mounting hole 141 on the mounting flange 140. When the liquid in the sensor 1 is frozen, an increased contact force is generated due to the volume expansion of the liquid in the sensor 1. Since the mounting flange 140 is elastically deformable, in the case of the increased contact force, the mounting flange 140 can be deformed elastically, so that the sensor 1 can move in a deformation direction of the mounting flange 140, and thus a portion of the liquid in the sensor 1 will move out of the sensor 1 when the liquid is frozen, so as to maintain the volume of the remained liquid in the sensor 1, compensate partly the volume expansion caused by the frozen liquid, and further reduce or prevent the damage of the components of the pressure sensor 1. In one embodiment, the flexible mounting member 275 allows the housing 100 to deflect and deform as needed.

Referring to FIGS. 7A-7D below, a method for manufacturing the plug 300 according to the present disclosure is described. FIGS. 7A-7D are schematic views showing the steps of forming the plug according to an embodiment of the present disclosure. According to the present disclosure, a method for manufacturing the plug 300 is provided. The method includes a primary molding step of molding a body 310 using elastomeric material, so that a chamber 304 or plurality of chambers 304 are formed in the interior of the body (FIG. 7A). The method next includes a covering step of placing a chamber cover 307 to enclosed chamber so as to enclose the chamber(s) 304 (FIGS. 7A and 7B). Another molding step includes molding a secondary molding material 330 onto the chamber cover 307 (FIGS. 7B and 7C). According to a preferable solution, the above method can further comprise a fusing step of fusing the body formed through the primary molding step and the portion (e.g., material 330) formed through the secondary molding step, so as to form a complete plug 300 and a sealed enclosed chamber 304 (FIG. 7D).

Still referring to FIGS. 7A-D, the steps of the method will be described in detail now, with respect to the particular embodiment of FIG. 3 for example. In the case of the plug 300 of FIG. 3, the molding steps of the plug include a primary molding step of molding a body 310 provided with an inner cavity 313 and a through-hole 303. The body 310 includes a hole wall 302 used to form the through-hole 303 and an outer side wall 301. The hole wall 302 forms the through-hole 303 radially inward of the outer side wall 301. The inner cavity 313 is formed between the hole wall 302 and the outer side wall 301. The hole wall 302 is connected with the outer side wall 301 at the lower end 312. A plurality of ribs 305 are connected between the hole wall 302 and the outer side wall 301. The plurality of ribs 305 extend in the axial direction and the radial direction of the plug 300. These ribs 305 can be arranged symmetrically or asymmetrically around the hole wall 302 to facilitate the molding of the plug 300 as would be appreciated by those of ordinary skill in the molding arts.

A covering step includes placing a chamber cover 307 onto an upper end of the body 310, so as to cover the inner cavity 313. The chamber cover 307 is used to prevent migration of the molding materials into the chamber 304 during the molding of the plug 300. The chamber cover 307 is ring-shaped with a central hole 308. The chamber cover 307 can be rigid, for example can be made of a rigid material, so as to facilitate the plug 300 to be closely fitted into the pressure tube 120 of the housing 100.

A secondary molding step includes molding a secondary molding material 330 onto an upper end of the body 310 above the chamber cover 307. The secondary molding material 330 has a generally annular shape with a central opening 331. The secondary molding material 330 is disposed around the hole wall 302 and the through-hole 303.

A fusing step includes fusing the body 310 formed through the primary molding step and the secondary molding material 330, so as to form a complete plug 300 and a sealed inner chamber 304, i.e. a hollow structure. After fusing, the plug 300 with the structure of FIGS. 2A-2C is complete.

With respect to the embodiment such as in FIGS. 4A-4D, the method is generally similar, except that in the primary molding step, a through-channel 351 is formed on a perimeter of the body 310, rather than a through-hole is formed in the body. Further, in the case that the sloped portion 352 is provided, the sloped portion is formed in the primary molding step, the secondary molding step and/or the fusing step.

The pressure sensor, a plug used with the pressure sensor and a method for manufacturing the plug according to the present disclosure have substantial technical advantages.

The volume expansion due to liquid freezing can be compensated to avoid the damage of the sensing element etc., by means of the deformation of the portion used to constitute the communication passageway to change the volume of the communication passageway, controlling the freezing sequence of the liquid within the cavity, or being provided with an elastic mounting flange, or the like. Even in the case of the most restrict enclosed freezing (a freezing under the liquid fully filling the space of an enclosed sensor), the volume expansion due to liquid freezing can be compensated effectively, so as to prevent damage of the components of the pressure sensor.

The plug can be suitable for different application requirements (temperature, medium, pressure or the like). From the above, it can be seen that it is possible for the plug to select the material, the thermal conductivity or the like according to different application requirements. The rigid cover can provide advantageous fitting, so as to simplify the configuration. The flange being made of plastic or metal sheet also can compensate at least partly the volume expansion due to liquid freezing. The plug is flexible, and thus can be used in applications with different configuration and size. From the above, it can be seen that the plug is an independent component mounted in the pressure tube, so that a suitable plug can be selected according to the configuration and size of the application, and the same plug can be used in other pressure sensors having the same size, which is universal. The plug does not need to be designed especially since it can be an optional accessory.

The one skilled in the art will appreciate that while several embodiments have been described, these embodiments are in the scope of the present disclosure. In the case of no substantial conflict, one or more technical features in one embodiment can be advantageously incorporated into other embodiments, without departing from the scope of the invention. The technical features in all embodiments can be deleted and combined to create new embodiment(s), which may also fall into the scope of the invention. It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the invention as defined by the appended claims.

What is claimed is:

1. A pressure sensor comprising:
    a housing defining a communication passageway;
    a sensing element disposed in the housing, the sensing element being in fluid communication with an outside of the housing through the communication passageway; and
    a compensating structure coupled to the housing so that when a contact force is increased due to occurrence of a volume expansion of a liquid passed into the housing through the communication passageway, the compensating structure accommodates the volume expansion for protection of the sensing element,
    wherein the compensation structure comprises a second compensating structure configured to control the freezing sequence of the liquid passed into the pressure sensor so that the liquid adjacent to the sensing element is frozen prior to the liquid away from the sensing element.

2. The pressure sensor according to claim 1, wherein the compensating structure comprises a first compensating structure configured to increase a volume of the communication passageway.

3. The pressure sensor according to claim 2, wherein the housing forms a pressure tube surrounding a portion of the communication passageway and the first compensating structure includes a plug fitted in the pressure tube of the housing.

4. The pressure sensor according to claim 3, wherein the plug is formed with a through-hole or through-channel on a perimeter of the plug which constitutes a portion of the communication passageway.

5. The pressure sensor according to claim 4, wherein a portion of the plug can be deformed elastically to change a volume of the communication passageway.

6. The pressure sensor according to claim 5, wherein an interior of the plug is formed with an enclosed chamber to facilitate deformation.

7. The pressure sensor according to claim 3, wherein the housing defines a groove on an inner wall of the pressure tube so that the groove cooperates with the plug to constitute a portion of the communication passageway.

8. The pressure sensor according to claim 7, wherein a chamber cover is disposed at an end of the chamber adjacent to the sensing element and the chamber cover is configured to assist in fitting the plug into the pressure tube of the housing.

9. The pressure sensor according to claim 1, wherein the second compensating structure includes a cavity formed between the sensing element and the pressure tube of the housing, wherein the cavity is in fluid communication with the communication passageway.

10. The pressure sensor according to claim 9, wherein the cavity has a surface area to volume ratio greater than that of the communication passageway.

11. The pressure sensor according to claim 10, wherein a ratio of the surface area to volume ratio of the cavity and the surface area to volume ratio of the communication passageway is in a range from 1.25:1 to 3:1 and the ratio of the surface area to volume ratio of the cavity and the surface area to volume ratio of the communication passageway is about 2:1.

12. The pressure sensor according to claim 9, wherein a first material used to form the cavity has an average thermal conductivity greater than that of a second material used to form the communication passageway.

13. The pressure sensor according to claim 1, wherein
the housing forms a pressure tube surrounding a portion of the communication passageway and the first compensating structure includes a plug fitted in the pressure tube of the housing and
the second compensating structure includes a flange radially inwardly extending from the pressure tube, the flange being positioned between the sensing element and the communication passageway to at least partially cover the plug so that a cavity adjacent the sensing element freezes before the communication passageway by virtue of material selection of the flange and the plus, the flange defining a communication hole used to constitute a portion of the communication passageway.

14. The pressure sensor according to claim 1, wherein the compensating structure includes a third compensating structure configured to elastically deform to maintain a liquid volume within the pressure sensor, the third compensating structure comprising a mounting member, which is disposed on an outer side surface of the housing, the mounting member being elastic and configured to elastically deform to maintain the liquid volume within the pressure sensor when a force is applied to the pressure sensor due to the liquid volume expansion.

15. A plug for use with a pressure sensor having a housing formed with a pressure tube and a sensing element disposed within the housing, wherein a communication passageway is formed in the pressure tube and the sensing element is in fluid communication with an outside through the communication passageway, the plug comprising:
a body that forms a portion of the communication passageway, wherein the body deforms to compensate a volume expansion when a contact force is increased due to occurrence of the volume expansion of a liquid passed into the housing through the communication passageway, wherein
an interior of the plug is formed with an enclosed chamber;
an annular boss is formed at an end of the plug adjacent to the sensing element, wherein the annular boss is extended outwardly from the plug around the through-hole;
a plurality of ribs are formed in the chamber, wherein the plurality of ribs are extended in an axial direction and in a radial direction of the plug;
a chamber cover is disposed at an end of the chamber adjacent to the sensing element, the chamber cover being configured to assist in fitting the plug into the pressure tube of the housing; and
the through-hole, the through-channel or the groove is elongated.

16. The plug according to claim 15, wherein the plug is removably fitted in the pressure tube of the housing and formed with a through-hole which constitutes at least a portion of the communication passageway; or the perimeter of the plug is formed with an elongated through-channel which constitutes at least a portion of the communication passageway.

17. A pressure sensor comprising:
a housing defining a communication passageway;
a sensing element disposed in the housing, the sensing element being in fluid communication with an outside of the housing through the communication passageway; and
a compensating structure coupled to the housing so that when a contact force is increased due to occurrence of a volume expansion of a liquid passed into the housing through the communication passageway, the compensating structure accommodates the volume expansion for protection of the sensing element,
wherein the compensating structure includes a second compensating structure configured to elastically deform to maintain a liquid volume within the pressure sensor, the second compensating structure comprising a mounting member, which is disposed on an outer side surface of the housing, the mounting member being elastic and configured to elastically deform to maintain the liquid volume within the pressure sensor when a force is applied to the pressure sensor due to the liquid volume expansion.

* * * * *